US010963975B2

(12) United States Patent
Raghunathan et al.

(10) Patent No.: US 10,963,975 B2
(45) Date of Patent: Mar. 30, 2021

(54) SYSTEM ARCHITECTURE AND METHOD OF PROCESSING DATA THEREIN

(71) Applicant: Purdue Research Foundation, West Lafayette, IN (US)

(72) Inventors: Vijay Raghunathan, West Lafayette, IN (US); Arnab Raha, Santa Clara, CA (US)

(73) Assignee: Purdue Research Foundation, West Lafayette, IN (US)

(*) Notice: Subject to any disclaimer, the term of this patent is extended or adjusted under 35 U.S.C. 154(b) by 16 days.

(21) Appl. No.: 16/445,091

(22) Filed: Jun. 18, 2019

(65) Prior Publication Data

US 2019/0385247 A1    Dec. 19, 2019

Related U.S. Application Data

(60) Provisional application No. 62/686,669, filed on Jun. 18, 2018.

(51) Int. Cl.
*G06Q 50/06* (2012.01)
*G06F 1/3234* (2019.01)
*G06F 1/3296* (2019.01)
*G06F 1/3225* (2019.01)

(52) U.S. Cl.
CPC ........... *G06Q 50/06* (2013.01); *G06F 1/3225* (2013.01); *G06F 1/3265* (2013.01); *G06F 1/3296* (2013.01)

(58) Field of Classification Search
CPC ..... G06Q 50/06; G06F 1/3225; G06F 1/3296; G06F 1/3265; G06F 1/1686; G06F 1/325; G06F 1/3275; Y02D 10/00; H04N 5/23241; G09G 5/363; G09G 2330/021; G09G 2350/00

See application file for complete search history.

(56) References Cited

U.S. PATENT DOCUMENTS 7,853,816 B2 * 12/2010 Tanaka ................. G06F 1/3209
                                                    713/323
8,316,254 B2 * 11/2012 Kaneko .............. G06F 11/3062
                                                    713/323

(Continued)

OTHER PUBLICATIONS

Ma et al., A survey of energy-efficient compression and communication techniques for multimedia in resource constrained systems. IEEE Comm. Surveys Tutorials, pp. 963-972, 2013.

(Continued)

*Primary Examiner* — Charles R Kasenge
(74) *Attorney, Agent, or Firm* — Piroozi-IP, LLC

(57) ABSTRACT

A heuristic method of reducing energy consumption in a system having a plurality of subsystems is disclosed which includes identifying one or more approximation parameters in each of a plurality of subsystems, for an application that is run on the system with a predefined quality minimum approximating performance of each of the plurality of subsystems, determining energy savings for the system based on the approximation, sorting the plurality of subsystems based on system-level energy savings, classifying each of the plurality of subsystems into coarse and fine subsystems based on energy savings, and optimizing approximation of the one or more subsystems by i) approximating the coarse subsystems, and ii) approximating the fine subsystems.

20 Claims, 12 Drawing Sheets

(56) References Cited

U.S. PATENT DOCUMENTS

| | | | | |
|---|---|---|---|---|
| 8,918,661 | B2* | 12/2014 | Shigemura | G06F 3/0634 713/320 |
| 2010/0275047 | A1* | 10/2010 | Kaneko | G06F 1/3203 713/323 |
| 2014/0075220 | A1* | 3/2014 | Song | G06F 1/3212 713/320 |
| 2017/0321918 | A1* | 11/2017 | Asada | F24F 11/30 |

OTHER PUBLICATIONS

Karakonstantis et al., Herqules: System level cross-layer design exploration for efficient energy-quality trade-offs. In Proc. ISLPED, pp. 117-122, 2010.

Raha et al., Synergistic Approximation of Compu-tation and Memory Subsystems for Error-Resilient Applications. IEEE Embedded Systems Letters, 9(1):21-24, 2017.

Raha et al., Towards Full-System Energy-Accuracy Tradeoffs: A Case Study of an Approximate Smart Camera System. In Proc. DAC, 2017.

Vogelsang et al., Understanding the energy consumption of dynamic random access memories. In Proc. MICRO, pp. 363-374, 2010.

Raha et al., Quality Contig-urable Approximate DRAM. IEEE Trans. Computers, pp. 1172-1187, 2017.

Raha et al., Energy-Efficient Reduce- and-Rank Using Input-Adaptive Approxima-tions. IEEE TVLSI, pp. 462-475, 2017.

Lee, Espressif. ESP8266, Mar. 2017.

Gupta et al., IMPACT: IMPrecise adders for low-power approximate computing. In Proc. ISLPED 2011, pp. 409-414, 2011.

Raha et al., Input-Based Dynamic Reconfiguration of Approximate Arithmetic Units for Video Encoding. IEEE Tran. on VLSI Systems, 24(3):846-857, 2016.

Kulkarni et al., Trading Accuracy for Power with an Underdesigned Multiplier Architecture. In Proc. VLSI Design, pp. 346-351, 2011.

Ranjan et al., ASLAN: Synthesis of Approximate Sequential Circuits. In Proc. DATE, pp. 364:1-6, 2014.

Esmaeilzadeh et al., Neural Acceleration for General-Purpose Approximate Programs. In Proc. MICRO-45, pp. 449-460, 2012.

Samadi et al., SAGE: Self-tuning Approximation for Graphics Engines. In Proc. MICRO-46, pp. 13-24, 2013.

Venkataramani et al., Quality Programmable Vector Processors for Approximate Computing. In Proc. MICRO-46, pp. 1-12, 2013.

Sidiroglou-Douskos et al., Managing Performance vs. Accuracy Trade-offs with Loop Perforation. In Proc. ESEC/FSE, pp. 124-134, 2011.

Raha et al., Quality Configurable Reduce- and-rank for Energy Efficient Approximate Computing. In Proc. DATE, pp. 89-98, 2015.

Shoushtari et al., Exploiting Partially-Forgetful Memories for Approximate Computing. IEEE Embedded Systems Letters, pp. 19-22, 2015.

Raha et al., Quality-aware data allocation in approximate DRAM. In Proc. CASES, pp. 89-98, 2015.

Sampson et al., Approximate Storage in Solid-state Memories. In Proc. MICRO, pp. 25-36, 2013.

Mittal, A Survey of Techniques for Approximate Computing. ACM Comput. Surv., pp. 62:1-62:33, 2016.

Stanley-Marbell et al., Lax: Driver Interfaces for Approxi-mate Sensor Device Access. In HotOS, 2015.

Zhao et al., Online OLED dynamic voltage scaling for video streaming applications on mobile devices. In Proc. CODES, pp. 1-10, 2013.

Jung et al., Approximate computing with partially unreliable dynamic random access memory—approximate dram. In Proc. DAC, pp. 100:1-100:4, 2016.

Barr et al., Energy-aware lossless data compression. ACM Trans. Comput. Syst., pp. 250-291, 2006.

Zordan et al., On the performance of lossy compression schemes for energy constrained sensor networking. ACM Trans. Sen. Netw., pp. 15:1-15:34, 2014.

Sadler et al., Data compression algorithms for energy-constrained devices in delay tolerant networks. In Proc. of SenSys, pp. 265-278, 2006.

\* cited by examiner

FIGs. 4a, 4b, 4c, and 4d

SYSTEM ARCHITECTURE AND METHOD OF PROCESSING DATA THEREIN

CROSS-REFERENCE TO RELATED APPLICATIONS

The present patent application is related to and claims the priority benefit of U.S. Provisional Patent Application Ser. No. 62/686,669 filed 18 Jun. 2018, the contents of which are hereby incorporated by reference in its entirety into the present disclosure.

STATEMENT REGARDING GOVERNMENT FUNDING

This invention was not made with government support. under CNS0953468 awarded by the National Science Foundation. The government has certain rights in the invention.

TECHNICAL FIELD

The present disclosure generally relates to system architectures, and in particular, to system architectures designed to manage application-level energy usage vs. system-level approximation of individual subsystems.

BACKGROUND

This section introduces aspects that may help facilitate a better understanding of the disclosure. Accordingly, these statements are to be read in this light and are not to be understood as admissions about what is or is not prior art.

Energy usage particularly for battery operated devices is a major concern. Many subsystems in mobile devices operate at their highest capabilities resulting in the best output these subsystems can generate regardless of the application-level needs. For example, a camera taking a photo in a mobile phone may be configured to always take photos at its highest pixel resolution, translating to a certain energy consumption.

Many algorithms and subsystems in such mobile devices are known to allow approximations. For example, a mobile device may be configured to take a photograph using the onboard camera at a fraction of the highest resolution. Such an approximation will result in a reduction of energy usage. Alternatively, a mobile device may be configured receive a photograph taken at the highest resolution however process it at a smaller resolution. Such processing would be considered an approximation for the processor and would result in a smaller energy cost. Another example is a memory subsystem. Typically, a memory subsystem includes volatile memory (e.g., Random Access Memory RAM)) that will result in loss of data when power is removed. In such subsystems, the volatile memory is typically refreshed periodically to eliminate or at least minimize data corruption. However, some application-level algorithms may be able to tolerate some data corruption. As a result, reducing refresh rate in a memory may result in acceptable application-level quality. Such reduction of refresh rate is considered an approximation. Thus, certain subsystems in a large system may offer quality dials, thus allowing changing their respective outputs from a maximum capability to a lower capability. Changing such capabilities are henceforth referred to as approximation.

However, in a system comprising multiple subsystems, approximation of one subsystem may have significant impact on another subsystem. While others in the prior art may have attempted to provide approximation of one or more subsystems, such approximations were without concern for how each subsystem approximation affects other subsystems and furthermore in the context of the overall system.

Therefore, there is an unmet need for a novel approach to provide subsystem approximation while considering impact on other subsystems, the overall system, and application-level quality.

SUMMARY

A heuristic method of reducing energy consumption in a system having a plurality of subsystems is disclosed. The method includes identifying one or more approximation parameters in each of a plurality of subsystems. For an application that is run on the system with a predefined quality minimum, the method further includes reducing performance (approximation) of each of the plurality of subsystems by identifying a corresponding value for each of the one or more approximation parameters in each of the plurality of subsystems such that quality of the application is about the same as the predefined quality minimum. The method further includes determining energy savings for the system based on setting the one or more approximation parameters to the corresponding values for each of the plurality of subsystems while maintaining the other of the plurality of subsystems at non-reduced performance. The method also includes sorting the plurality of subsystems based on system-level energy savings. Additionally, the method also includes classifying each of the plurality of subsystems into coarse and fine subsystems, whereby changing values for the one or more approximation parameters of a coarse subsystem results in significantly more energy savings than changing values for the one or more approximation parameters of a fine subsystem. In addition, the method also includes optimizing the values of the one or more approximation parameters while maintaining quality level of the application at or above the predefined quality minimum by i) adjusting the values of the one or more parameters of the coarse subsystems, and ii) adjusting the values of the one or more parameters of the fine subsystems.

A computing system comprising of a plurality of subsystems is disclosed. The computing system includes a memory subsystem including a non-transitory computer readable medium. The computing system also includes a computing subsystem including a processor, the processor configured to implement a heuristic method of reducing energy consumption in the system having the plurality of subsystems. The method includes identifying one or more approximation parameters in each of a plurality of subsystems. For an application that is run on the system with a predefined quality minimum, the method further includes reducing performance (approximation) of each of the plurality of subsystems by identifying a corresponding value for each of the one or more approximation parameters in each of the plurality of subsystems such that quality of the application is about the same as the predefined quality minimum. The method further includes determining energy savings for the system based on setting the one or more approximation parameters to the corresponding values for each of the plurality of subsystems while maintaining the other of the plurality of subsystems at non-reduced performance. The method also includes sorting the plurality of subsystems based on system-level energy savings. Additionally, the method also includes classifying each of the plurality of subsystems into coarse and fine subsystems, whereby changing values for the one or more approximation parameters of a coarse subsystem results in significantly more energy savings than changing values for the one or more approximation parameters of a fine subsystem. In addition, the method also includes optimizing the values of the one or more approximation parameters while maintaining quality level of the application at or above the predefined quality minimum by i) adjusting the values of the one or more parameters of the coarse subsystems, and ii) adjusting the values of the one or more parameters of the fine subsystems.

DETAILED DESCRIPTION

Figure 1A:
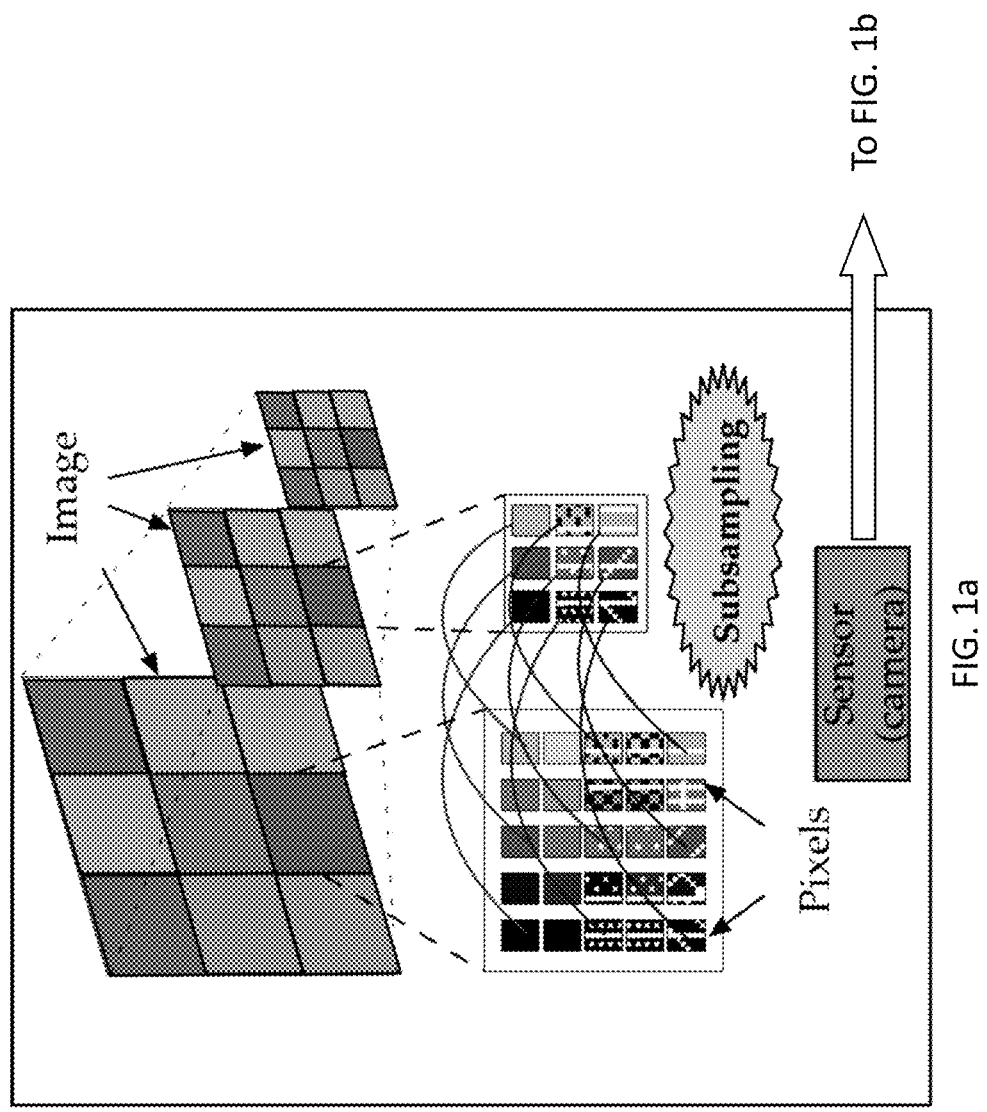
FIGS. 1a, 1b, and 1c are schematics of subsystem approximations, according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is provided in the present disclosure to modulate quality output (approximation) of each subsystem in a system comprising multiple subsystems while considering impact on other subsystems, the overall system, and application-level quality. Such system-level and application-level energy and quality awareness resulting from subsystem approximation can result in significant energy savings without deleterious impact on output quality of the application. As such, this goal improves the functionality of a computing system in a non-abstract manner. While the approximations of the present disclosure have already been shown to improve the functionality of the associated computing system in the below-described actual reduction to practice for limited approximation dials, the methodology described herein will usher in new approximation dials for existing subsystems thereby resulting in further improvements in the form of energy savings of today's computing systems.

Towards the aforementioned goal, the present disclosure provides a heuristic methodology comprising two distinct steps. First for each subsystem in the system, the method of the present disclosure determines the quality dials associated with that subsystem's approximation. For example, for a camera sensor one quality dial may be reduction of sensor resolution by skipping lines in a sensor. For example, a 12 Mpixel sensor (i.e., a sensor that generates a 12 Mpixel image) may have a maximum of 3000 pixels in the vertical direction and 4000 pixels in the horizontal direction. One such approximation dial may be to skip every other line in the horizontal and vertical directions thereby reducing the sensor's image production to 3 Mpixel. Alternatively, another approximation may be to skip every two lines, thereby reducing sensor image production to about 5.3 Mpixels. Another alternative approximation dial may be to use maximum resolution of the camera for a central portion of the sensor, however, reduce the resolution for outer portions.

Several types of approximation dials are considered. These dials fall in several different categories. For example, the approximation dials can be divided into i) circuit-level, ii) architecture-level, and iii) software-level. At the circuit-level, circuits are designed to perform imprecisely thus generating a quality cost vs. savings in energy costs. In some cases, circuit-level approximation are chosen when the energy savings far exceed losses in quality. Circuit-level approximation may come in two varieties: 1) component-level, and 2) construction-level. Examples of component-level approximations include operators such as adders and multipliers and how they produce results using approximation dials. Example of construction-level includes disposition of components each with approximation dials but provided in selective sequential order. The architecture-level approximation is based on providing approximation dials that selectively affect the system from an architectural perspective. Examples of architectural-level approximation include neural network based approximate accelerators for power modulation, input adaptive general purpose graphics processing unit (GPGPU) approximations, and quality programmable vector processors, known to a person having ordinary skill in the art. Examples of software-level approximation includes loop perforation and early loop termination, known to a person having ordinary skill in the art. The approximation dials are known apriori.

Once the approximation dials for each subsystem are thus determined, the method of the present disclosure then determines effects of approximations of each subsystem insofar as energy savings vis-a vis the approximation of that subsystem and further its impact on application-level quality in the context of an overall computing system. This determination occurs for each subsystem which can be then be used to provide a full-system approximation. For simplicity, henceforth application-level quality vs. energy is referred to Q-E. Through the aforementioned determination of approximation for each subsystem, an awareness is generated by the method of the present disclosure as to Q-E tradeoffs at different granularities for these subsystems. For example, in a system comprising of image sensor (camera's sensor), memory, and processor, the aforementioned determination may result in identification of the sensor as the subsystem such that changing the quality dial of the sensor results in a coarse change while changing approximation dials for the memory and the processor result in fine changes in the system-level energy and application-level quality. Thus the aforementioned determination of individual subsystems results in a sorting of impact in Q-E.

Second, once the impact of changes of approximation dials on energy savings for the subsystems and the associated application-level quality costs are known, the method of the present disclosure heuristically tunes the approximation dials of the associated subsystems to maximize system-level energy saving while ensuring the needed quality is achieved at application-level.

This novel approach was actually reduced to practice for a system comprising four subsystems: 1) a camera subsystem having an image sensor for acquiring an image having a known maximum amount of data associated with full capabilities of the sensor, 2) a memory subsystem having dynamic RAM (DRAM) for storing for storing the data from the sensor, 3) a computation subsystem having an embedded processor for processing the data held in the DRAM, and 4) a communication subsystem for communicating the processed data.

As discussed above, the method of the present disclosure is based on two parts. First, the method identifies the approximation dials and then based on those approximation dials determines Q-E approximation of each subsystem based on energy impact on the system as a whole and quality of the application as a whole. The total system energy and thus savings is calculated as a sum of these individual subsystems including image sensor, memory, processor as well as supporting modules such as frame-buffer, memory controller, color converter, etc. Other peripherals are assumed to contribute a constant amount of idle energy. Out of these three subsystems, the energy consumed by the sensor solely is small compared to the overall system energy since the time taken for image acquisition is usually much smaller than the total processing time. It should be noted that the sensor remains in the lowest power mode during inactivity. On the other hand, the memory subsystem is a constant source of energy usage given that it requires to be refreshed periodically, and in particular given the rise in DRAM nowadays. The computation subsystem is also a significant source of energy consumption when processing. Its energy consumption is calculated as a product of the average processor power multiplied by the total active time.

Figure 1B:
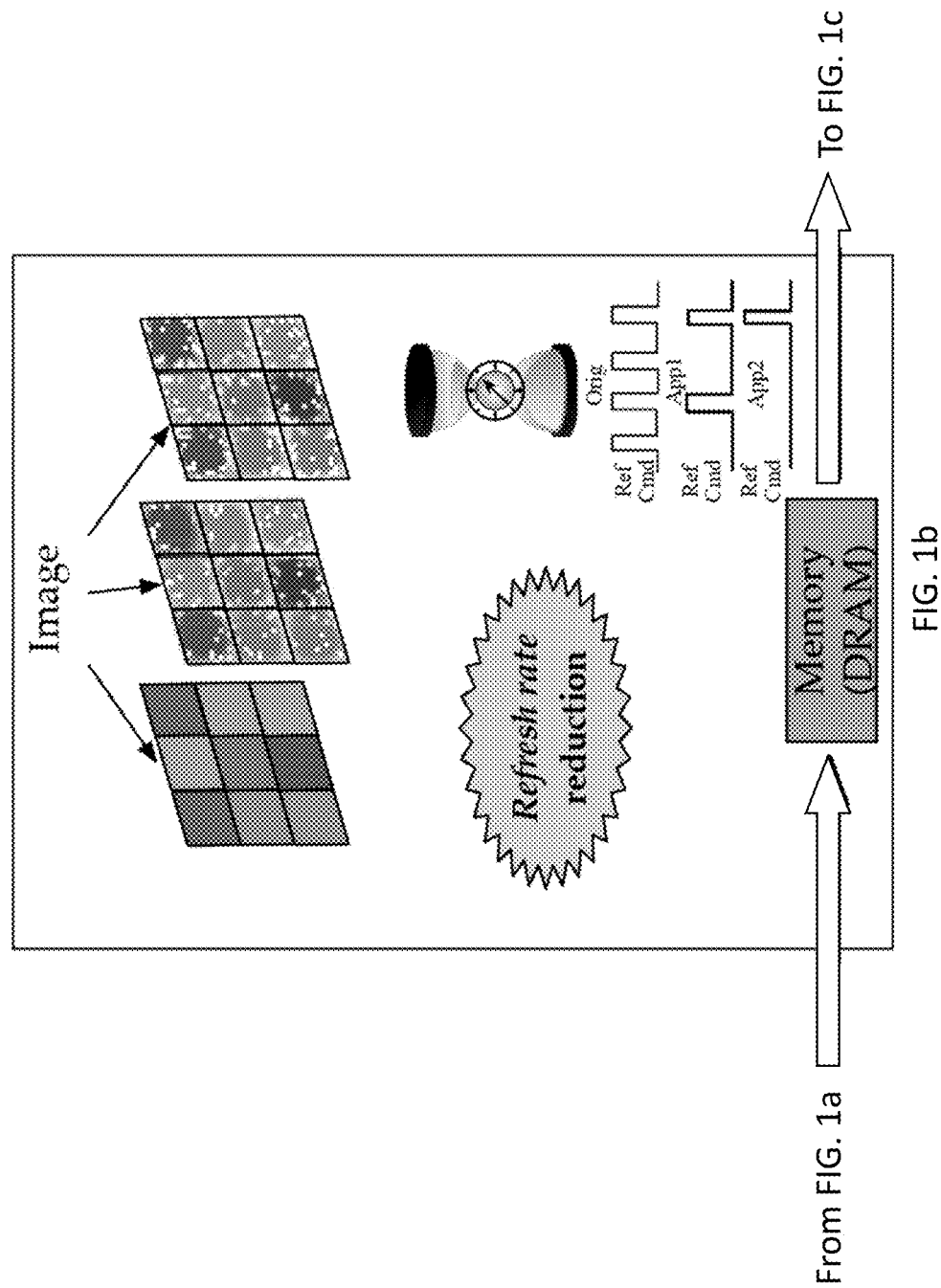
Figure 1C:
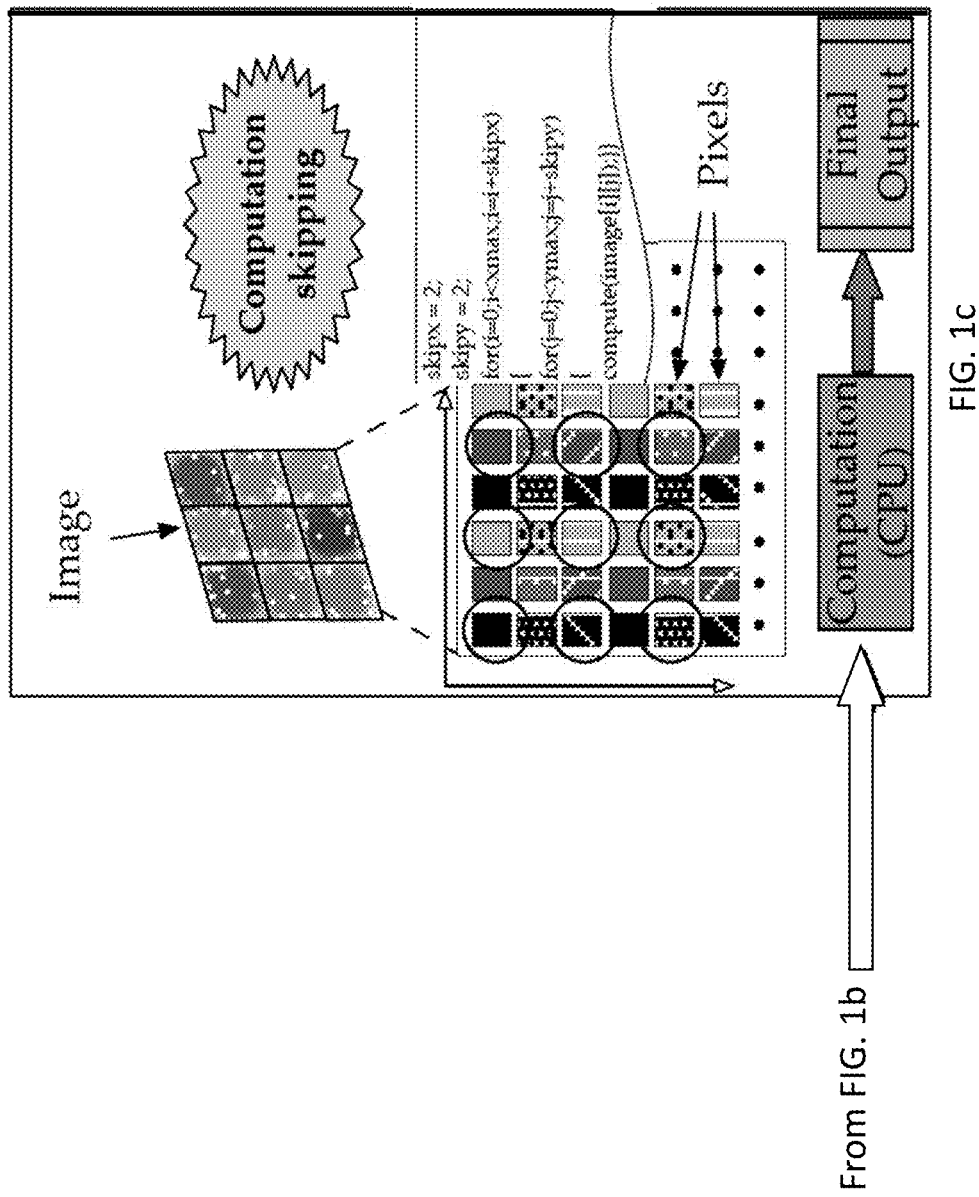

Referring to FIGS. 1a, 1b, and 1c, schematics of subsystem approximation are provided, according to one embodiment of the present disclosure. Suppose the application of the system shown in FIGS. 1a-1c is image recognition. FIG. 1a shows approximation of the sensor. As discussed above, sensors can be approximated using various techniques such as voltage scaling, global sampling resolution/rate reduction, selective sampling resolution/rate reduction, etc. Pixel subsampling generates an image of lower resolution which can be a good way of approximation of the sensor.

Figure 2A:
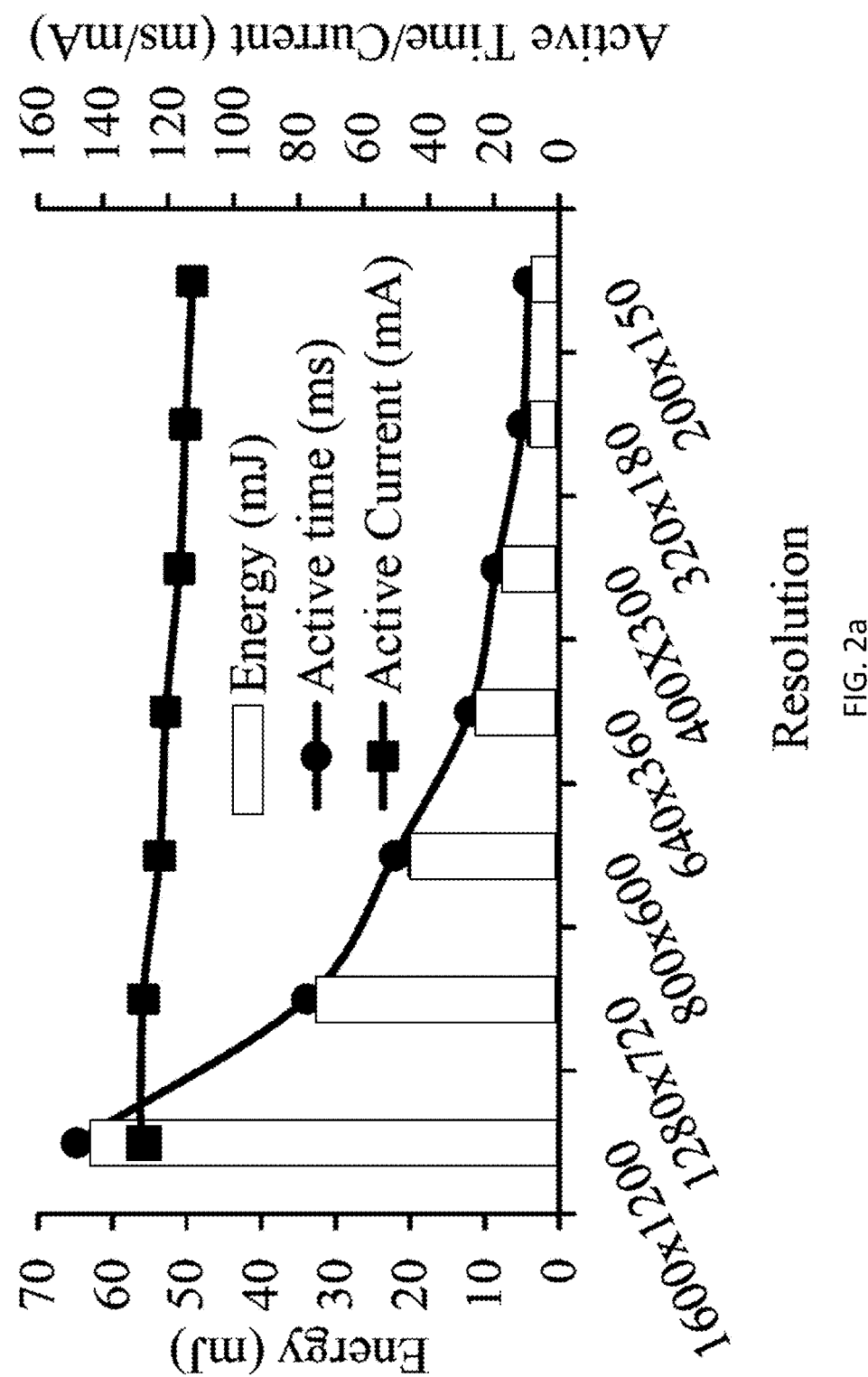
FIG. 2a is a complex graph of energy in mJ vs. resolution vs. active time/current measured in ms/mA.
Figure 2B:
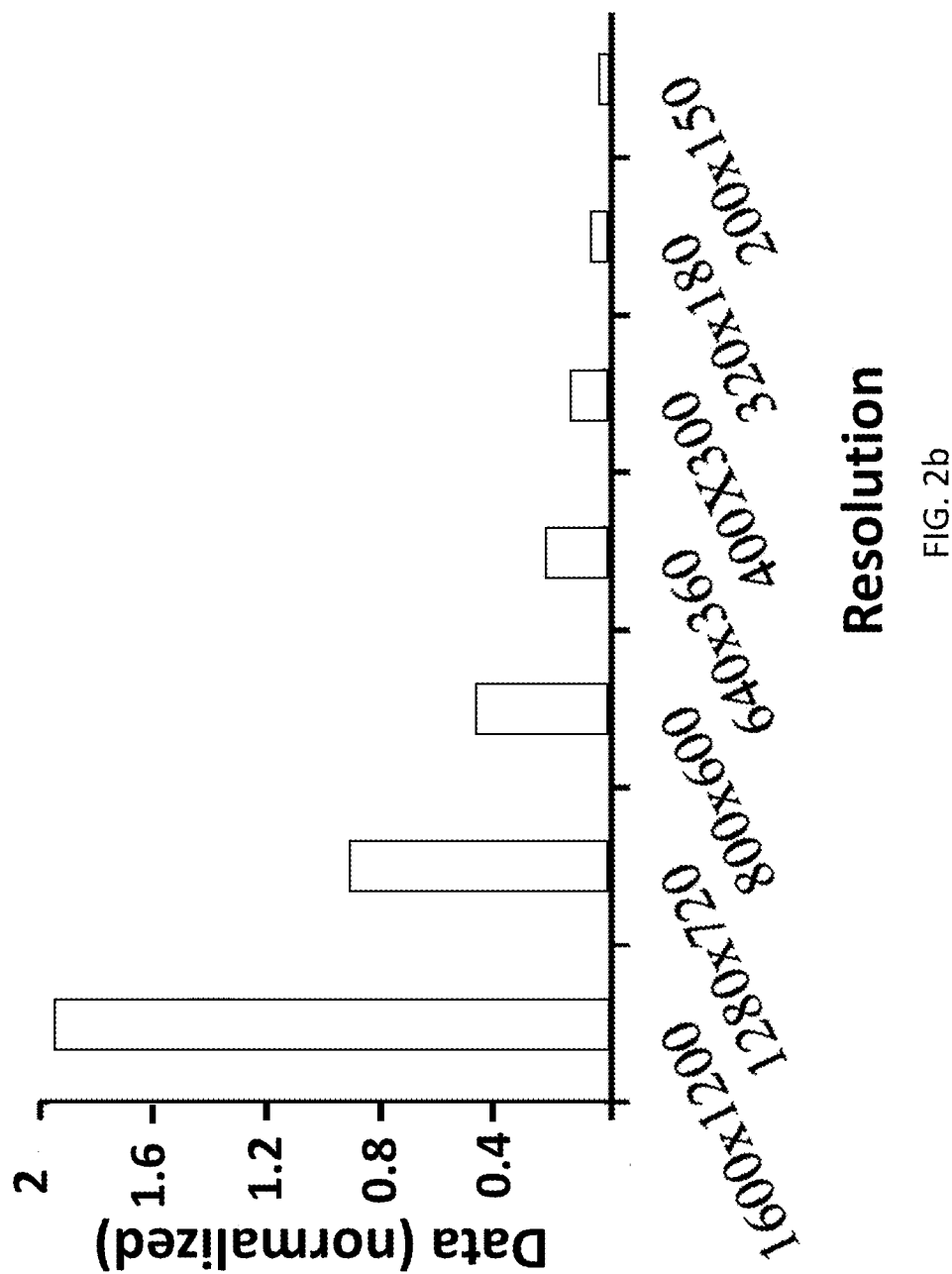
FIG. 2b is a bar graph of normalized amount of data plotted against resolution, according to the present disclosure.

A straightforward approach to pixel subsampling includes skipping adjacent pixels, as discussed above in rows, columns, or both. The pixel skipping can be done periodically to create a lower resolution image as shown in FIG. 1a. It should be noted that lowering the resolution not only reduces the active power consumption but also reduces the sensor's active time. Referring to FIG. 2a, a complex graph of energy in mJ vs. resolution vs. active time/current measured in ms/mA is provided. As seen in FIG. 2a for an image sensor, e.g. a MICRON MT9P001, both energy and active time/current reduces as image resolution decreases. Both active time and thus energy are reduced precipitously as the resolution is reduced. It should also be noted that when the resolution is reduced, the amount of data generated is also reduced, precipitously. This reduction is shown in FIG. 2b where normalized amount of data is plotted against resolution. It should be appreciated that changes in resolution belongs to the software-level class of approximation dials. Therefore, for the image sensor as part of the camera subsystem image resolution is chosen as the approximation dial.

Figure 3:
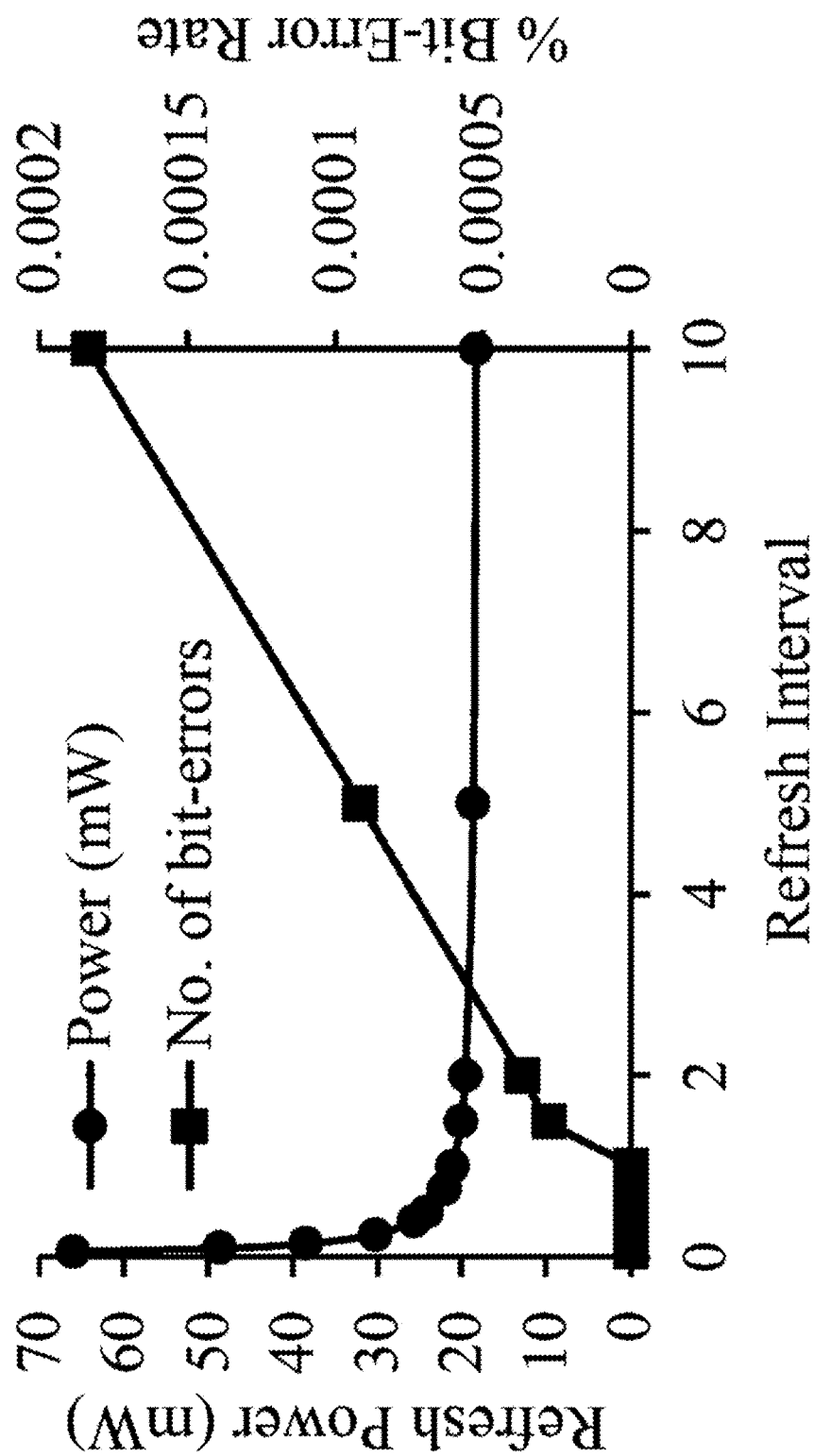
FIG. 3 is a graph of refresh power measured in mW is plotted against refresh interval and % bit-error rate.

Memory is the next subsystem. Refresh rate is chosen as the approximation dial for the DRAM which is part of the memory subsystem. Refresh rate is measured by refresh interval; increasing the refresh interval increases the total number of errors in DRAM, but it also results in lower refresh energy consumption as shown in FIG. 3. Referring to FIG. 3 a graph of refresh power measured in mW is plotted against refresh interval and % bit-error rate. It can be seen that as the refresh rate is increased the % bit-error rate increases while the refresh power decreases. It should be noted that errors introduced by increasing refresh interval are random in nature. Thus at sub-optimal refresh intervals there exist both erroneous DRAM pages (pages with retention bit-errors) and non-erroneous DRAM pages (pages without a single retention bit-error). It should be appreciated that changes in refresh interval belongs to the software-level class of approximation dials. Therefore, for the memory subsystem, refresh interval of the DRAM is chosen as the approximation dial.

The next subsystem is the computing subsystem. Computation skipping is an efficient software-based approximation technique. There are different approaches to computation skipping. For example, eliminating computations for similar image pixels (e.g., adjacent pixels to one another) is an effective way of reducing energy consumption while maintaining application-level quality at an acceptable level. There are two major types of computation skipping techniques: i) Loop Perforation—this technique enables computation skipping over similar types of pixels while traversing each pixel in an image—this type of skipping can be used to skip over adjacent pixels, and ii) Early Loop Termination—this technique terminates the computation process without processing a part of the total input, e.g., processing a central portion of the image while skipping the outer portions of the image. It should be appreciated that computation skipping belongs to the software-level class of approximation dials. Therefore, for the computing subsystem, computation skipping by the processor is chosen as the approximation dial.

With the approximation dials of the three subsystem (camera subsystem, memory subsystem, and computation subsystem) identified, the method of the present disclosure now provides how to heuristically tune these dials to achieve an acceptable application-level quality while reducing the system-level energy.

Figure 4:
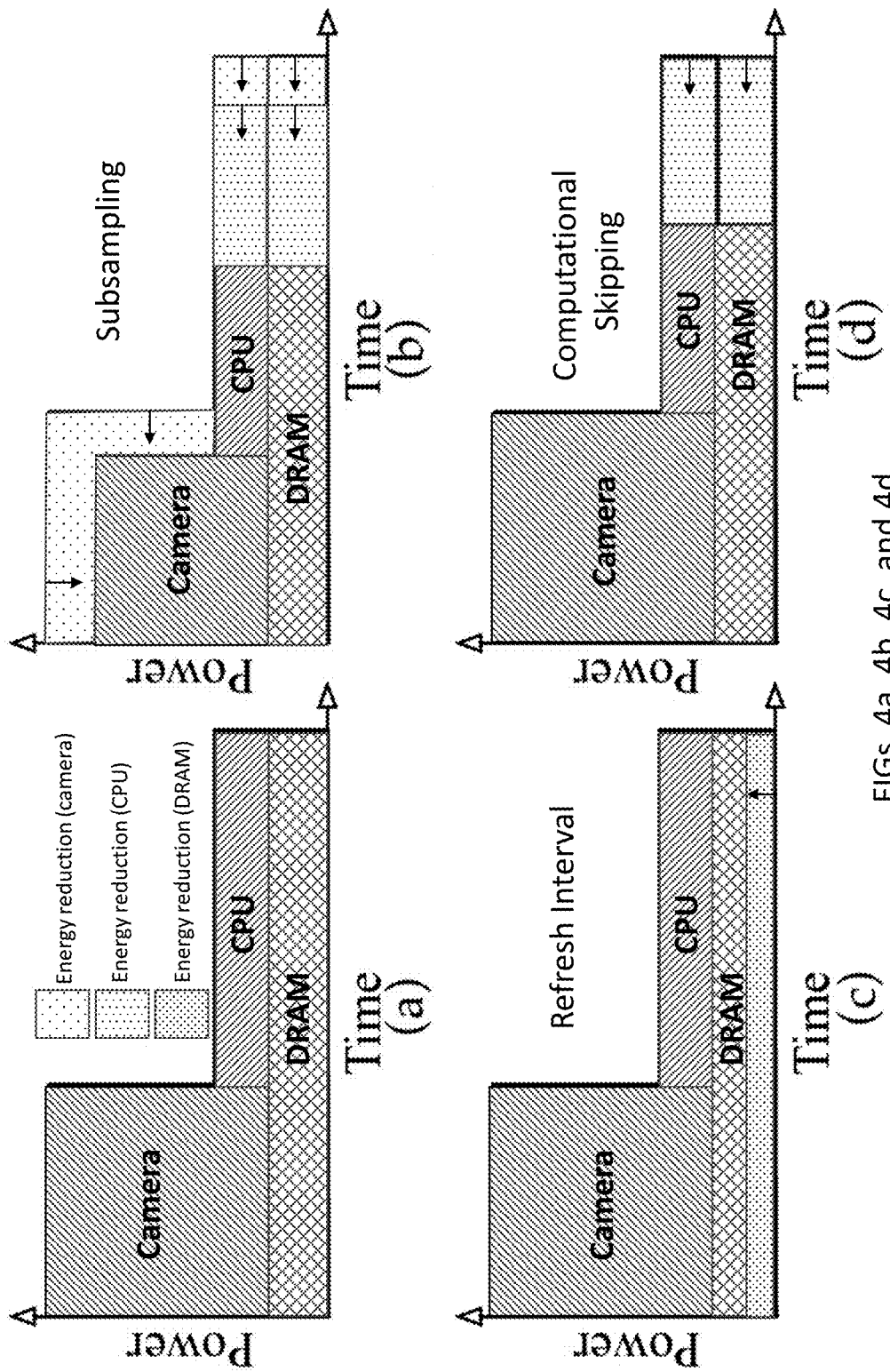
FIGS. 4a, 4b, 4c, and 4d are schematics of energy reduction as a result of changes in the approximation in various subsystems, according to the present disclosure.

As discussed above, changes in approximation dials of different subsystems may have disparate impact on energy savings. For example, changing the sensor resolution, has a larger impact on system-level energy savings than either memory refresh interval or computational skipping. Referring to FIGS. 4a, 4b, 4c, and 4d, schematics of energy reduction as a result of changes in the approximation in various subsystems are provided. FIG. 4a shows graphical representations of active energy consumption (power consumption over a period of time) for the three subsystems without any approximation. FIG. 4b shows the result of subsampling of the sensor as an approximation which not only decreases the energy consumption of the camera subsystem but also decreases the computation energy time due to a reduction in the amount of data, thereby reducing the overall time the system is active and thus uses energy. This reduction of data thus play a significant role in reduction of energy usage up to an order of magnitude, reducing the total time during which the system is active to a large extent. Increases in refresh intervals, thereby changing DRAM energy affects how much time the DRAM, reducing the active time which results in a reduction in average power consumption, as shown in FIG. 4c. Finally, FIG. 4d shows the reduction in energy due to computational skipping which reduces processor time leading to reduction both the energy required for computation and total DRAM idle energy consumption as shown in FIG. 4d. Note that this can also potentially result in large system energy reduction as it eliminates a large amount of processing data straightaway. As shown in FIGS. 4b and 4d, sensor subsampling and computation skipping mask DRAM bit-errors by complete elimination of DRAM data where errors may exist.

Inspecting FIGS. 3a-4d reveals that while subsampling the sensor can result in the most amount of energy saving (i.e., has the largest impact of the three methods), it can also result in the largest impact on application-level quality since this approximation skips large amounts of data at once. As a result, subsampling as an approximation represent the coarse approximation, while DRAM refresh interval increases (i.e., decreasing refresh rate) as an approximation and computational skipping (either loop perforation or early loop termination) as an approximation represent fine approximation insofar as Q-E considered.

In order to automatically determine which of the several approximation dials would represent a coarse approximation and which would represent fine approximation, reference is made to the algorithm 1 provided below.

---
Algorithm 1:
---
Input: Set of application-level qualities: Q[N]
Output: Set of quality dial configuration: $\gamma_f$ [N] and energy consumption: E[N] corresponding to Q[N]
for (i = 0; i < N; i = i + 1) do
    m = 0;
    while (app_qual ($\gamma$[m]) ≥ Q[i]) do
    m = m+1; // increase approx degree until Q violation
    E[i] = compute_energy ($\gamma$ [m – 1]); $\gamma_f$ [i] = $\gamma$[m – 1]
return $\gamma_f$, E

---

With Q-E for each subsystem determined, algorithm 2 provided below uses a gradient descent approach to find which of the approximation dials provide coarse or fine approximation and then tunes the approximation dials.

In the approximation methodology of the present disclosure, an important characteristic is the Q-E relationship based on application-level quality bounds that allow the methodology to automatically determine settings for each of the approximation dials. However, prior to determining system-wide tuning of the approximation, the approximation dials for individual subsystems are determined based on quality bound. Algorithm 1 shows the pseudo-code for obtaining the individual Q-E curves. Here, $\gamma$ represents the approximation dial for each component sorted in the increasing order of approximation degree and $\gamma_f$ represents the final approximation dial setting corresponding to a specified quality bound. It should be appreciated that even for the individual subsystem approximations, the quality is evaluated (app_qual( )) at the application-level keeping the other subsystems without approximation. Algorithm 1 evaluates the optimal quality dial setting ($\gamma_f$) corresponding to each application-level quality specification (Q[i]) in the Q-E plot. The approximation degree (m) is increased until the point that the output quality bound is violated as provided in the while loop for a given quality bound (Q[i]).

With Q-E determined for each subsystem based on application-level quality bounds, the tuning of the approximation dials is now discussed. As such, the Q-E for each subsystem is used to heuristically tune the approximation dials in order to evaluate the Q-E curve for the overall system which is described in Algorithm 2. It should be appreciated that both energy consumption ($E_s$, $E_c$, $E_m$) and output qualities ($Q_s$, $Q_c$, $Q_m$) of the subsystems are functions of the corresponding approximation degrees (i, j, k). As a result, for each subsystem, increase in approximation degree reduces both energy as well as application quality. This heuristic approach tries to maximize the extent to which the subsystems can be approximated (e.g., the sensor resolution can be lowered) for a given quality bound, as it not only decreases the subsystem's energy but also reduces the entire system's energy by a considerable margin for a given quality bound. This can be accomplished by first using only the sensor Q-E. Intuitively, this will always result in significant energy savings greater than any combination of memory and computation approximations as it skips computational data in the coarsest granularity possible (e.g., skip every alternate row or column in the image sensor). As discussed above, with respect to FIGS. 4a-4d, reducing the computation time helps to reduce both computation and DRAM energy. Once the sensor approximation is performed, the heuristic approach of Algorithm 2 chooses to perform gradient descent over the individual Q-Es acquired from the memory and computation subsystems to arrive at the best possible configuration of the quality control dials. Gradient descent iteratively selects to approximate either the memory or computation depending on which subsystem has a higher energy savings to quality degradation ratio (gradient). Algorithm 2 shows that the gradient descent is performed at the minimum granularity at which the memory and computation approximation dials can be tuned till the quality specification is violated. This fine granular control leads to a good Q-E tradeoff curve for the entire system.

Note that software associated with Algorithm 1 and Algorithm 2 are both executed during an initial calibration phase using a training input dataset for each application. In this phase, the appropriate settings are determined for each subsystem approximation dial corresponding to the different output quality settings using the training inputs specific to the application. These approximation dials settings are subsequently utilized during the evaluation phase on the test inputs based on the required quality bound. Note that the calibration phase can be periodically invoked for adapting the quality dials according to the variations in the nature and characteristics of the inputs over time. In Algorithm 1 and Algorithm 2, all quality and energy values are normalized to the application-level quality and system-level energy. The heuristic approach assumes that the errors due to individual subsystems are additive in nature.

---
Algorithm 2:
---
Input: Application-level quality bound: $Q_B$; Q–Es for N subsystems: $Q_s$–$E_s$ for s = 0 to N–1
Output: Quality dial configurations ($\Gamma_s$) and least energy consumption (E) corresponding to $Q_B$
    Initialize: Q=1, E=1, j=0

-continued

Algorithm 2:

```
Initialize: i_0 = i_1 = ... i_{N-1} = 0 // i_s [s=0 to N-1] are approximation
  degrees
//perform gradient descent over all N subsystems
while ((Q≥Q_B) && (j==N)) {
    for (s =0; s< N; s++) {
        E_sΔ =E_s[i_s] – E_s[i_s+1];
        Q_sΔ =Q_s[i_s] – Q_s[i_s+1];
        R_sΔ = E_sΔ / Q_sΔ ;
    } // end for
    S_list = sort_{max2min}(N, R_{[s=0 to N-1]Δ}) // N subsystems sorted in
descending order based on R_sΔ, where s = 0 to N-1
    for (j=0; j<N; j++) {
        k = S_list(j); // k is the subsystem identifier within the sorted
list S_list (same as s before)
        if (Q – Q_k(i_k+1) ≥ Q_B) {
            E = E – E_kΔ; Q = Q – Q_kΔ;
            i_k = i_k+1 ;
            break;
        } // end if
    } // end for
} // end while
Γ_s = i_s for s = 0 to N-1
return (Γ_s , E)
```

Figure 5:
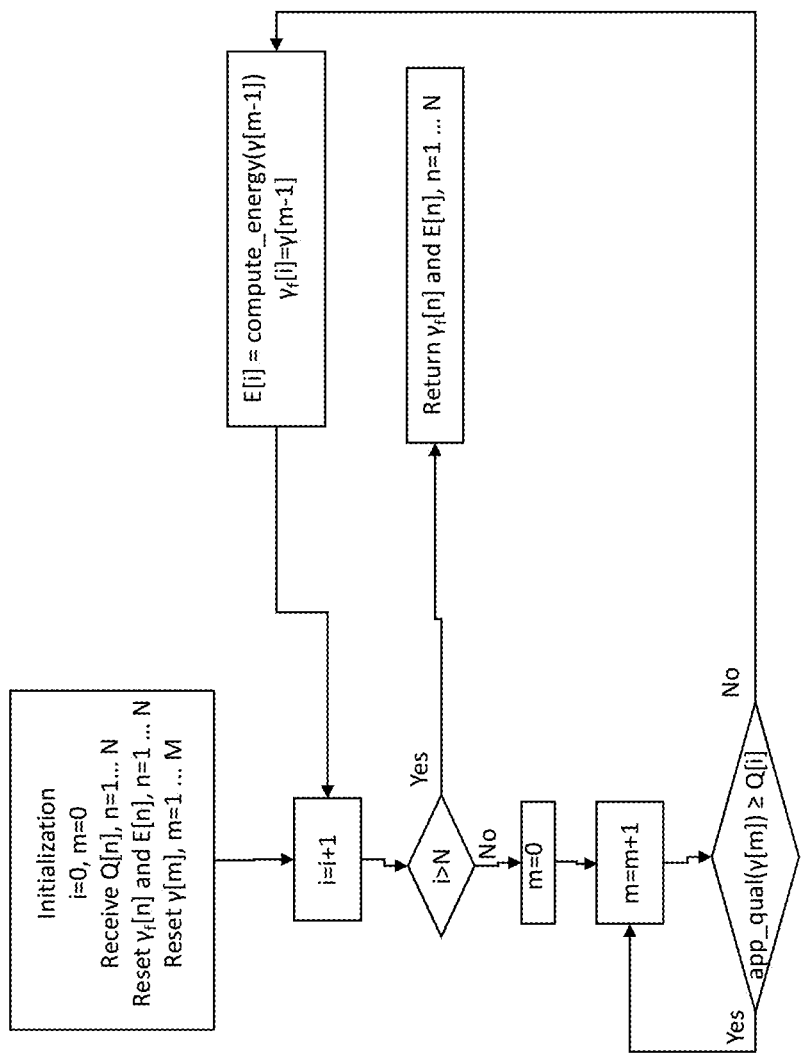
FIG. 5 is a flowchart associated with an algorithm of the present disclosure.
Figure 6:
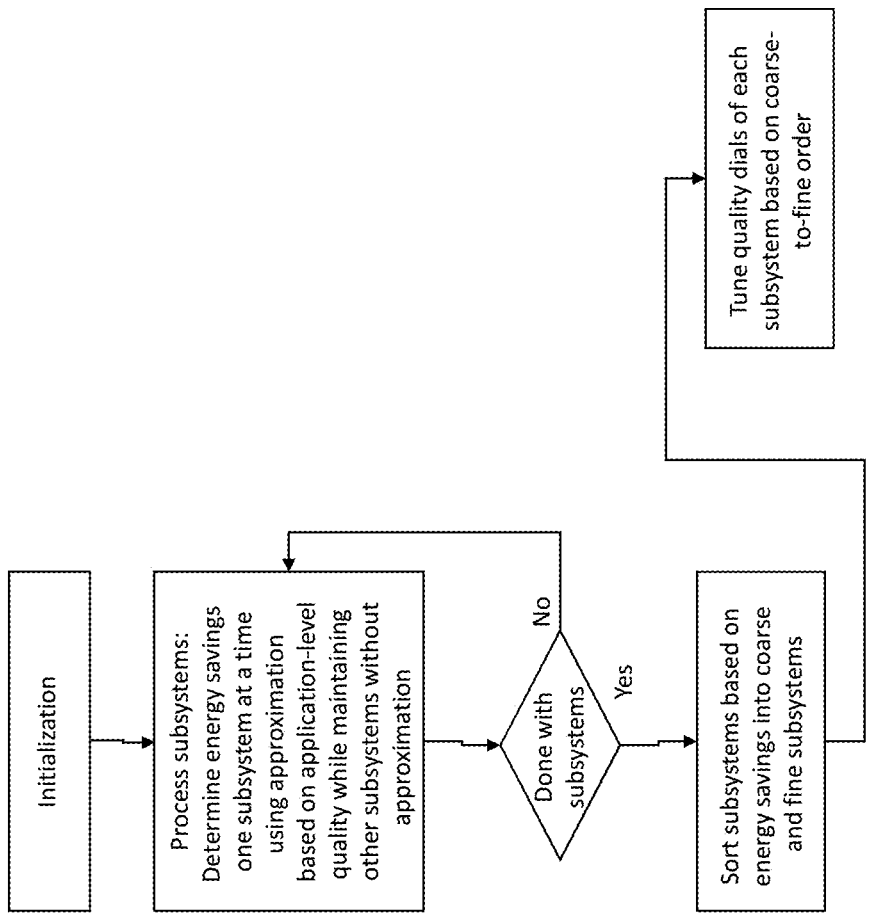
FIG. 6 is a flowchart associated with another algorithm of the present disclosure.

A graphical representation of algorithm 1 is provided in FIG. 5 while a graphical representation of algorithm 2 is provided in FIG. 6.

The methodology of the present disclosure was reduced to practice for the aforementioned subsystems. Six application benchmarks including digit recognition (using two different algorithms), image segmentation, Sobel edge detection, face detection, and image filtering were used to evaluate the methodology of the present disclosure. These six applications are listed in Table 1.

TABLE 1

Benchmarks used for evaluation

| Application | Algorithm (Abbreviation) | (App) Quality Metric (Significance of value) |
|---|---|---|
| Digit Recognition I | k-Nearest Neighbors (KNN) | % Classification accuracy (Higher is better) |
| Face Detection | Viola-Jones using Haar features (HAAR) | % Detection accuracy (Higher is better) |
| Image Segmentation | K-Means Clustering (IMG-SEG) | % Deviation in pixels of a particular class (Lower is better) |
| Edge Detection | Sobel Operator (SOBEL) | % Correct edge count (Higher is better) |
| Digit Recognition II | Convolutional Neural Networks (CNN-LeNet5) | % Classification accuracy (Higher is better) |
| Image Blurring | Matrix multiplication with image filter (IMAGE-FILTER) | Mean SAD wrt. accurate output (Lower is better) |

The application benchmarks were tested on a custom smart camera system. The actual reduction to practice included a NIOS II soft processor core without any hardware approximations. The processor was programmed on a 40 nm process technology based ALTERA STRATIX IV GX FPGA integrated within a TERASIC TR4-230 development board. The FPGA platform included a HYNIX 1 GB DDR3 SODIMM DRAM module3 operating at 1.5 V utilized to implement the frame-buffer and the applications themselves. The FPGA platform was interfaced with a TERASIC TRDB D5M 5MP camera module consisting of a Micron MT9P001 CMOS digital image sensor. Additionally, for operating the DDR3 DRAM and the D5M modules, an ALTERA UniPHY DDR3 memory controller (allowing refresh interval approximation) and the ALTERA Frame Buffer IP. The camera was configured using I2C. The allocation of the frame-buffer and the application data to desired DRAM pages were accomplished using a custom memory allocator integrated within the µC-OS II. The system was operated at 133 MHz.

The average power consumption of the NIOS II processor was measured using the ALTERA POWERPLAY Power Analyzer tool and the DRAM energy consumption was measured with the help of an ADEXELEC DDR3-SODIMM-01 extender containing a current-sensing resistor along with a high precision KEITHLEY-6430 SOURCEMETER. The latency and power consumption of the camera module for different resolutions were measured during image acquisition using a SALAE LOGIC ANALYZER and a FLUKE 187 Multimeter, respectively. The total energy consumption of the system for each application was calculated during program execution by taking a sum of the energy consumed by the processor (average power multiplied by processing time), DRAM module, the camera module, memory controller, frame-buffer, memory allocator, and other miscellaneous functional blocks. It should be noted that the system energy was calculated for iso-work condition, where the total energy consumed is proportional to the time taken to process a single input corresponding to each application. Individual subsystem Q-Es for each error-resilient application were obtained and the results were fed into the controller implementing Algorithm 1 and Algorithm 2 was implemented in software as an additional function within each benchmark.

As discussed above, the methodology of the present disclosure was tested on a set of evaluation benchmarks as provided in Table 1. Each benchmark is described herein, briefly.

Handwritten digit recognition was implemented in two different ways using two well-known algorithms: (i) K-Nearest Neighbors (KNN) and (ii) Convolutional Neural Network (CNN). KNN is a Reduce-and-Rank type algorithm that selects the top-K closest reference vectors (or training digit images) to identify the handwritten digit acquired using the image sensor. Along with sensor subsampling and DRAM refresh interval increase (i.e., refresh rate reduction), computation skipping is performed by omitting similar adjacent pixels during the reduction operation (based on Euclidean distance). In addition, a technique of inter-leaved reduction-and-ranking, known to a person having ordinary skill in the art was also applied. Note that for detection-based applications, lowering the image resolution is acceptable as long as the image is correctly identified.

The CNN used in digit recognition included 7 hidden layers (with 3 convolutional layers and 2 subsampling layers). The first convolutional layer operates directly on image pixels, and hence, allows skipping pixel windows (or receptive fields of neighborhood units) due to spatial locality during processing of each feature map. Initial sensor subsampling was performed on images and DRAM refresh rate reduction as well.

Face detection application leverages the Viola-Jones based framework that uses Haar-based features to detect a face. Sensor subsampling, refresh rate reduction, and computation skipping are all performed on acquired images. Sensor subsampling was performed to reduce the image resolution which is effective as long as all the faces are correctly detected. Computation skipping is applied by modifying the step count by which the detection window glides over the entire image in each loop run.

Image segmentation is performed using KMEANS algorithm that partitions an image into a number of distinct segments which are used for object detection. The KMEANS algorithm segments an image into K clusters by grouping similar type of pixels based on certain pre-determined characteristics. The output quality depends on the number of pixels that are correctly segmented. Sensor approximation can lead to a lower resolution image while computation-skipping uses loop perforation to skip over similar pixels and assign it to the same cluster. On the other hand, early loop termination allows truncation of the iterative refinement process for cluster formation with negligible output quality degradation. Memory approximation introduces controlled amounts of errors in the stored image.

Sobel edge detection application uses the Sobel gradient operator for edge detection. In this case, sensor sub-sampling reduces the resolution of the image, while DRAM refresh rate reduction introduces errors in the acquired image. Computation skipping is used to selectively allocate adjacent pixels to be classified as an edge or not. Note that these approximation techniques can be applied as long as the correct number of edges are identified.

Image filtering benchmark performs an image-blurring operation of the input image and produces the blurred image at the output. This functionality is generally used for image correction. In addition to sensor subsampling during image acquisition and DRAM approximation, computation skipping is realized by skipping the filtering operation (matrix multiplication) for adjacent pixels and assigning them the same value as computed for the initial representative pixel window. Note that for sensor subsampling, pixel values were copied for adjacent rows and columns to maintain the output resolution same as the input.

Using the benchmarks discussed above, experimental results obtained using the reduction to practice prototype shows system-level energy savings of about 7.5× for minimal (less than about 1%) application-level quality loss when comparing to systems with no approximations. When comparing to individual subsystem approximation, the method of the present disclosure provides a full-system approximation that achieves energy benefits of about 3.5 time to about 5.5 times on average for minimal (about less than 1%) quality loss.

Figure 7A:
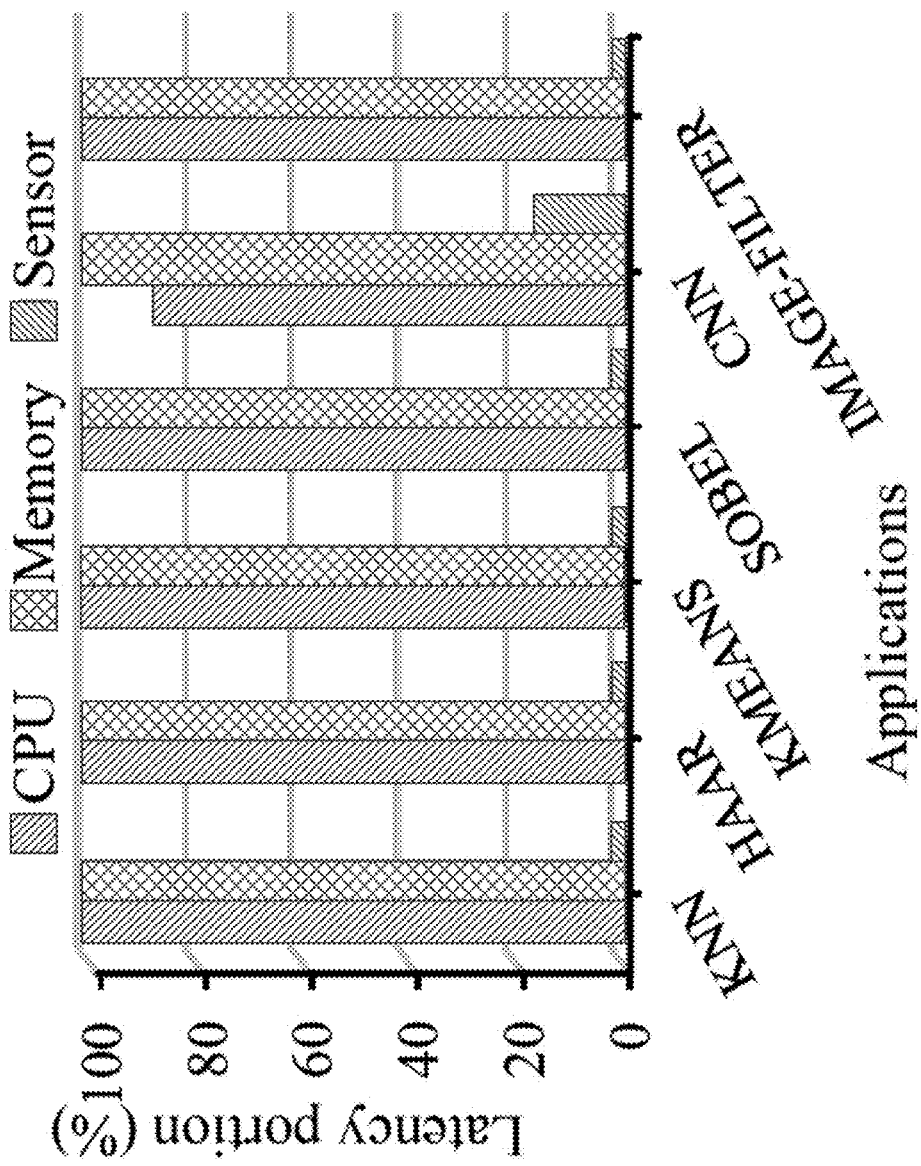
FIG. 7a represents bar graphs of active time spent in each subsystem as a fraction of the total time required for processing a single input is shown for each of the benchmarks as related to each of the subsystems.
Figure 7B:
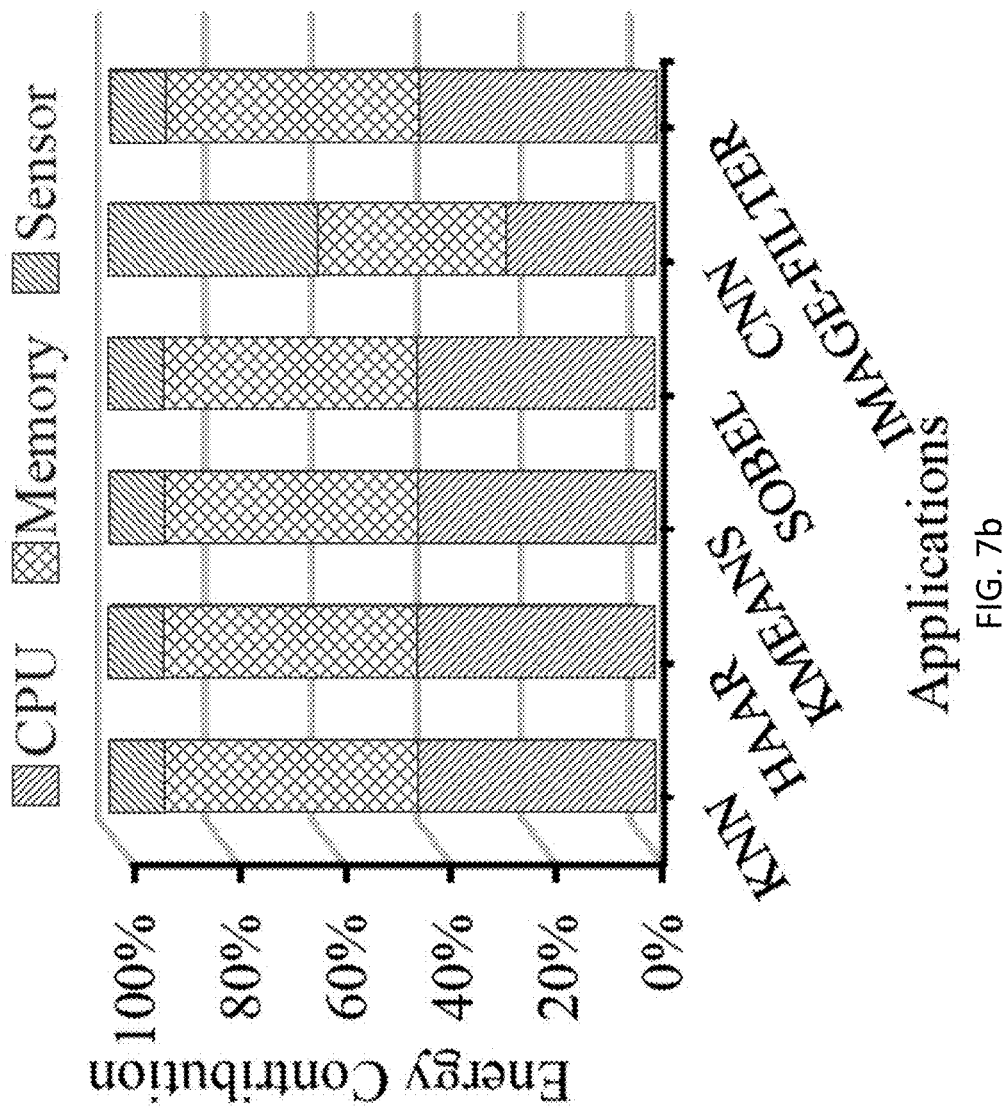
FIG. 7b represents bar graphs of the energy breakup for three subsystems, according to the present disclosure.

Referring to FIG. 7a, bar graphs of active time spent in each subsystem as a fraction of the total time required for processing a single input is shown for each of the benchmarks as related to each of the subsystems. Inspection of FIG. 7a reveals time for which the sensor is active is usually very small compared to the total processing time. Memory is active for the longest duration as it needs to be active during both sensor and processing operations. Referring to FIG. 7b, bar graphs of the energy breakup for the three subsystems are shown.

For most cases, the energy contributed by the memory and the CPU are almost equal since they are active for about the same duration and they have roughly about the same power consumption.

Figure 8:
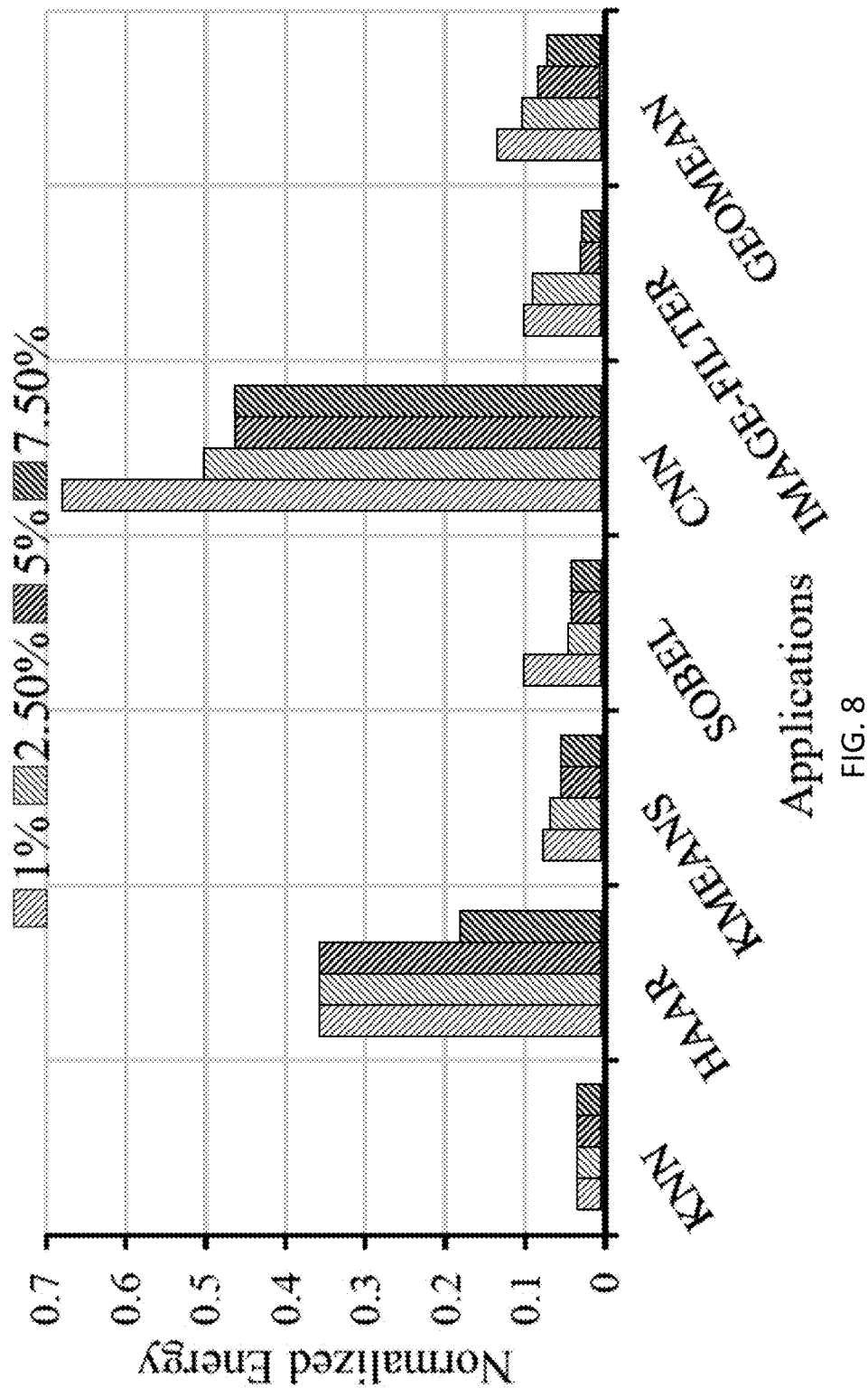
FIG. 8 represents bar graphs of system-level energy consumption for each of six benchmarks.

It is helpful to see how energy usage corresponds to quality bound (e.g., see algorithms 1 and 2). Referring to FIG. 8, bar graphs of system-level energy consumption for each of the six benchmarks is shown. In FIG. 8, the energy values for the system are normalized with respect to the energy consumption with no approximations. As depicted in FIG. 8, the method of the present disclosure results in reductions in system-level energy consumption on an average of about 7.5 times for virtually no quality degradation (about less than 1%). Further, this energy improvement jumps to 9.7×, 12.7×, and 14.4× associated with application-level quality loss bounds of 2.5%, 5%, and 7.5%, respectively. Note that applications such as HAAR and CNN spend a major portion of their overall computational effort on program sections other than the one which directly operates on the image data. Hence, sensor subsampling and computation skipping have smaller impact on the overall energy consumption for these applications as compared to the others. However, for all other applications, sensor subsampling still generates the largest energy savings as it eliminates a significant portion of the computational data.

While a specific two-part approach is disclosed herein, it should be appreciated that a global minimization approach can also be applied to all the approximation dials, each establishing a dimension, and thereby establish a solution based on optimizing a multi-dimensional solution. The solution seeks a global minimum for energy while maintaining a minimum application-level quality. Examples of such optimization processes can be found in U.S. Pat. No. 9,857,779 to Varadi, albeit for a completely different application.

Those having ordinary skill in the art will recognize that numerous modifications can be made to the specific implementations described above. The implementations should not be limited to the particular limitations described. Other implementations may be possible.

The invention claimed is:

1. A heuristic method of reducing energy consumption in a system having a plurality of subsystems, comprising:
   identifying one or more approximation parameters in each of a plurality of subsystems of a system;
   for an application that is run on the system with a predefined quality minimum:
   a) reducing performance of each of the plurality of subsystems by identifying a corresponding value for each of the one or more approximation parameters in each of the plurality of subsystems such that quality of the application is about the same as the predefined quality minimum;
   b) determining energy savings for the system based on setting the one or more approximation parameters to the corresponding values for each of the plurality of subsystems while maintaining the other of the plurality of subsystems at non-reduced performance;
   c) sorting the plurality of subsystems based on system-level energy savings;
   d) classifying each of the plurality of subsystems into coarse and fine subsystems, whereby changing values for the one or more approximation parameters of a coarse subsystem results in substantially more energy savings than changing values for the one or more approximation parameters of a fine subsystem; and
   e) optimizing the values of the one or more approximation parameters while maintaining quality level of the application at or above the predefined quality minimum by i) adjusting the values of the one or more parameters of the coarse subsystems, and ii) adjusting the values of the one or more parameters of the fine subsystems.

2. The method of claim 1, wherein the optimization method is by a gradient descent algorithm.

3. The method of claim 1, wherein the coarse and fine subsystems classification is based on energy saving impact of about 2 to 1 for coarse subsystems.

4. The method of claim 1, wherein the coarse and fine subsystems classification is based on energy saving impact of about 3 to 1 for coarse subsystems.

5. The method of claim 1, wherein the coarse and fine subsystems classification is based on energy saving impact of about 5 to 1 for coarse subsystems.

6. The method of claim 1, wherein the coarse and fine subsystems classification is based on energy saving impact of about 10 to 1 for coarse subsystems.

7. The method of claim 1, wherein the coarse and fine subsystems classification is based on energy saving impact of about 50 to 1 for coarse subsystems.

8. The method of claim 1, wherein the steps a)-e) are performed at an initial calibration stage of running the application.

9. The method of claim 8, wherein the steps a)-e) are repeated periodically after the initial calibration stage.

10. The method of claim 1, wherein the energy savings of the system is between about 7.5 times to about 14.4 times of the system with no approximation for a quality degradation of about 1% to about 7.5%, respectively.

11. A computing system comprising of a plurality of subsystems, comprising:
  a memory subsystem including a non-transitory computer readable medium;
  a computing subsystem including a processor, the processor configured to implement a heuristic method of reducing energy consumption in the system having the plurality of subsystems, comprising:
    identifying one or more approximation parameters in each of the plurality of subsystems of the system;
    for an application that is run on the system with a predefined quality minimum:
      a) reducing performance of each of the plurality of subsystems by identifying a corresponding value for each of the one or more approximation parameters in each of the plurality of subsystems such that quality of the application is about the same as the predefined quality minimum;
      b) determining energy savings for the system based on setting the one or more approximation parameters to the corresponding values for each of the plurality of subsystems while maintaining the other of the plurality of subsystems at non-reduced performance;
      c) sorting the plurality of subsystems based on system-level energy savings;
      d) classifying each of the plurality of subsystems into coarse and fine subsystems, whereby changing values for the one or more approximation parameters of a coarse subsystem results in substantially more energy savings than changing values for the one or more approximation parameters of a fine subsystem; and
      e) optimizing the values of the one or more approximation parameters while maintaining quality level of the application at or above the predefined quality minimum by i) adjusting the values of the one or more parameters of the coarse subsystems, and ii) adjusting the values of the one or more parameters of the fine subsystems.

12. The computing system of claim 11, wherein the optimization method is by a gradient descent algorithm.

13. The computing system of claim 11, wherein the coarse and fine subsystems classification is based on energy saving impact of about 2 to 1 for coarse subsystems.

14. The computing system of claim 11, wherein the coarse and fine subsystems classification is based on energy saving impact of about 3 to 1 for coarse subsystems.

15. The computing system of claim 11, wherein the coarse and fine subsystems classification is based on energy saving impact of about 5 to 1 for coarse subsystems.

16. The computing system of claim 11, wherein the coarse and fine subsystems classification is based on energy saving impact of about 10 to 1 for coarse subsystems.

17. The computing system of claim 11, wherein the coarse and fine subsystems classification is based on energy saving impact of about 50 to 1 for coarse subsystems.

18. The computing system of claim 11, wherein the steps a)-e) are performed at an initial calibration stage of running the application.

19. The computing system of claim 18, wherein the steps a)-e) are repeated periodically after the initial calibration stage.

20. The computing system of claim 11, wherein the energy savings of the system is between about 7.5 times to about 14.4 times of the system with no approximation for a quality degradation of about 1% to about 7.5%, respectively.

* * * * *